United States Patent
Bouthiette

(10) Patent No.: US 8,181,784 B2
(45) Date of Patent: May 22, 2012

(54) SEALING SHEET FOR USE TO CLOSE A CONTAINER-DEFINING SHEET

(75) Inventor: Michel Bouthiette, Granby (CA)

(73) Assignee: 9155-0020 Quebec Inc., Granby (Quebec) (CA)

( * ) Notice: Subject to any disclaimer, the term of this patent is extended or adjusted under 35 U.S.C. 154(b) by 288 days.

(21) Appl. No.: 12/613,121

(22) Filed: Nov. 5, 2009

(65) Prior Publication Data

US 2011/0049158 A1    Mar. 3, 2011

(30) Foreign Application Priority Data

Aug. 26, 2009  (CA) .................................... 2677124

(51) Int. Cl.
*B65D 83/04*    (2006.01)

(52) U.S. Cl. .................... 206/534; 206/530; 206/539

(58) Field of Classification Search .................. 206/528, 206/530, 531, 532, 534, 534.1, 534.2, 538, 206/539, 484; 220/359.1, 359.3
See application file for complete search history.

(56) References Cited

U.S. PATENT DOCUMENTS

| | | | |
|---|---|---|---|
| 2,207,045 A | 7/1940 | Wilder | |
| 3,630,346 A * | 12/1971 | Burnside | 206/532 |
| 3,924,748 A * | 12/1975 | Braverman | 206/534.1 |
| 4,089,415 A * | 5/1978 | Laib | 206/532 |
| 4,416,375 A * | 11/1983 | Braverman et al. | 206/534.1 |
| 5,788,079 A | 8/1998 | Bouthiette | |
| 6,021,623 A * | 2/2000 | Bouthiette | 206/534 |
| 6,023,916 A * | 2/2000 | Bouthiette | 206/534 |
| 6,382,420 B1 * | 5/2002 | Bouthiette | 206/534 |
| 6,681,935 B1 * | 1/2004 | Lewis | 206/534 |
| 7,308,984 B2 | 12/2007 | Bouthiette et al. | |
| 7,543,709 B2 | 6/2009 | Bouthiette | |

* cited by examiner

*Primary Examiner* — Luan K Bui

(74) *Attorney, Agent, or Firm* — Fish & Richardson P.C.

(57) ABSTRACT

Disclosed is a sealing sheet for use to close a container-defining sheet having a top surface comprising a given number of spaced apart cavities embossed therein, each of the cavities being upwardly opened and thus defining a container that is surrounded by a flange that is part of the top surface of the container-defining sheet. This sealing sheet has a top layer which can be glued to the flanges surrounding the containers of the container-defining sheet in order to close said containers. The top layer is advantageously made of a water-proof material such aluminum, in order to make the closure of the container-defining sheet moisture proof once such a closure has been completed. This top layer advantageously also has a top surface that is printable to ensure that relevant information as to the content of each container being made available on it if desired.

4 Claims, 5 Drawing Sheets

SEALING SHEET FOR USE TO CLOSE A CONTAINER-DEFINING SHEET

BACKGROUND OF THE INVENTION

The present invention relates to an improved sealing sheet for use to close a plurality of containers formed in a container-defining sheet, especially but not exclusively for the storage of individual pills or tablets to be administered to a patient.

BRIEF DESCRIPTION OF THE PRIOR ART

It is of common practice in the pharmaceutical field to prepare sets of individual containers containing pills and/or tablets to be administered to a patient. Each of these containers contains pills and/or tablets that the patient has to take together at the same time during the day over a given period of time, preferably one week.

To prepare such sets of individual pill containers for use by a patient, it is also of common practice to use a sheet of plastic material in which a plurality of cavities are embossed. Each of these cavities defines a small upwardly opened container that can be filled with pills. After filling, all the containers are closed by means of a sealing sheet on which all desirable indications can be printed, like the patient's name, the date and hour of administration, etc. As it can be understood, the indications are printed and formatted onto the sealing sheet so that each group of information referring to a given container is positioned in regard to said container. Tearing lines are provided on both the container-defining sheet and the sealing sheet to permit easy separation of the individual pill containers.

For further information as to the structure, manufacture and use of such sets of individual pill containers, reference can be made to U.S. Pat. No. 5,788,079 and its Canadian counterpart No. 2,207,045 which both name the present inventor, and to all the prior art that was cited during their prosecution.

In practice, the sealing sheet used to close the containers of these known sets of individual pill containers can be made of plastic material and be thermosealed onto the container-defining sheet.

Alternatively, as disclosed in the above mentioned US and Canadian patents naming the present inventor, the sealing sheet can be made of paper or similar material and be glued onto the container-defining sheet. For this purpose, the sealing sheet comprises a top layer having a lower surface covered with a pressure sensitive adhesive glue and a bottom layer having an upper surface detachably fixed to the lower surface of the top layer by means of the adhesive glue. The bottom layer is peelable from the lower surface of the top layer to allow fixation of it onto the top surface of the container-defining sheet. Advantageously, this bottom layer has tearing lines punched into it in such a manner and position as to leave parts of it glued onto the bottom surface of the top layer in the form of a number of bottom pieces equal to the given number of cavities made in the container-defining sheet when the sealing sheet is peeled off. Each of these bottom pieces are shaped, sized and positioned so as to extend over a corresponding cavity of the container-defining sheet when the sealing sheet is properly applied to and glued on the flanges of the top surface of the container-defining sheet. These bottom pieces thus prevent the pill(s) stored in each of the containers from coming into contact with the adhesive glue.

As other examples of such a sealing sheet, reference can be made to U.S. Pat. Nos. 6,382,420, 7,308,984 and 7,543,709 which also names the present inventor.

All of these existing sealing sheets made of paper or similar material are efficient and easy to install and use. However, inasmuch as they are made of paper or similar material, they do not always meet a very specific requirement required for any closing system in the pharmaceutical field especially in the United States, namely, to be moisture proof for at least six months (such a requirement can be found in the US standard USP 671 class B).

SUMMARY OF THE INVENTION

It has now been found that the above-mentioned problem of providing a moisture proof closure of the individual pill containers formed in the container-defining sheet, can be achieved by using a sealing sheet as disclosed and claimed hereinafter, which comprises at least one layer made of aluminum or another water-proof material.

Thus, the invention is directed to a sealing sheet for use to close a container-defining sheet having a top surface comprising a given number of spaced apart cavities embossed therein, each of said cavities being upwardly opened and thus defining a container that is surrounded by a flange that is part of the top surface of said container-defining sheet, each of the flanges that are not directly adjacent to one side of the container-defining sheet being provided with a centrally positioned tearing line so as to make it possible to separate each of the containers from the adjacent containers and thus from the container-defining sheet whenever desired.

This sealing sheet basically comprises:
 a top layer having an upper surface and a lower surface that is covered at least in part with a pressure sensitive adhesive, said top layer also having tearing lines punched therein in such a manner and position as to be in line with the tearing lines made in the flanges on the top surface of the container-defining sheet and thus to allow said top layer, once glued onto the flanges of the container-defining sheet, to be splitted into a number of cover pieces equal to the number of containers, such making it possible to detach each of said containers from the container-defining sheet while keeping it closed; and
 a bottom layer having an upper surface detachably connected to the lower surface of the top layer by means of said adhesive, said bottom layer being peelable from the lower surface of the top layer to allow fixation of said top layer onto the flanges on the top surface of the container-defining sheet by means of the adhesive covering its lower surface in order to close the containers defined in said container defining sheet, such a fixation being achieved in such a manner that no adhesive be left on top of each container and be at risk of coming into contact with elements stored in said container once the fixation has been completed, In accordance with this invention, the above sealing sheet is characterized in that its top layer is water-proof to make the closure of the container defining sheet moisture proof once the fixation has been completed, and also has its top surface being printable to ensure that relevant information as to the content of each container being made available on it if desired.

Advantageously but not exclusively:
 the container-defining sheet is made of plastic material; and
 the bottom layer of the sealing sheet is made of paper and has a covering of silicone on every part of its upper surface that is in contact with the adhesive that covers the lower surface of the upper layer of the sealing sheet.

In accordance with a first preferred embodiment of the invention:

the top layer of the sealing sheet has its bottom surface fully covered with the adhesive; and the bottom layer of said sealing sheet has cutting-lines made into it in such a manner and position as to leave parts of said bottom layer glued onto the bottom surface of the top layer in the form of a number of bottom pieces equal to the given number of cavities made in the container-defining sheet when said sealing sheet is peeled off, each of said bottom pieces being shaped, sized and positioned so as to extend over a corresponding cavity of the container-defining sheet when the top layer of the sealing sheet is properly applied to and glued on the flanges of the top surface of the container-defining sheet, the covering of silicone of said bottom layer being made of such a manner as not to extend onto said bottom pieces.

In accordance with a second preferred embodiment of the invention:

the top layer of said sealing sheet has its lower surface provided with patches of varnish applied in such a manner as to cover the adhesive that has been applied to all of said lower surface and form a number of bottom pieces equal to the given number of cavities made in the container-defining sheet when said sealing sheet is peeled off, each of said bottom pieces being shaped, sized and positioned so as to extend over a corresponding cavity of the container-defining sheet when the top layer of the sealing sheet is properly applied to and glued on the flanges of the top surface of the container-defining sheet.

In accordance with a third preferred embodiment of the invention:

the top layer of the sealing sheet has a number of bottom surface areas equal to the given number of cavities made in the container-defining sheet when said sealing sheet is peeled off, each of said bottom surface areas being shaped, sized and positioned so as to extend over a corresponding cavity of the container-defining sheet when the top layer of the sealing sheet is properly applied to and glued on the flanges of the top surface of the container-defining sheet, each of said surface areas being free from said adhesive.

Preferably, in all the above-mentioned embodiments, the top layer of the sealing sheet is made of aluminum. More specifically, the top layer can be made of an aluminum sheet having its upper surface covered with a primer or with a layer of paper, in order to make it printable.

It is worth mentioning however that any other kind of water-proof sheet could be used, provided that it has an upper surface printable and a bottom surface coverable by the pressure sensitive adhesive required to fit it onto the container-defining sheet. Such a water proof sheet can also be made of two or more layers of different materials, the only requirement again being that it is water-proof and its top surface be printable. By way of examples, such layers could include one layer of paper and one layer of plastic material.

This invention and its advantages will be better understood upon reading the following non-restrictive description of three preferred embodiments thereof, made with reference to the accompanying drawings.

DESCRIPTION OF THREE PREFERRED EMBODIMENTS OF THE INVENTION

Figure 1:
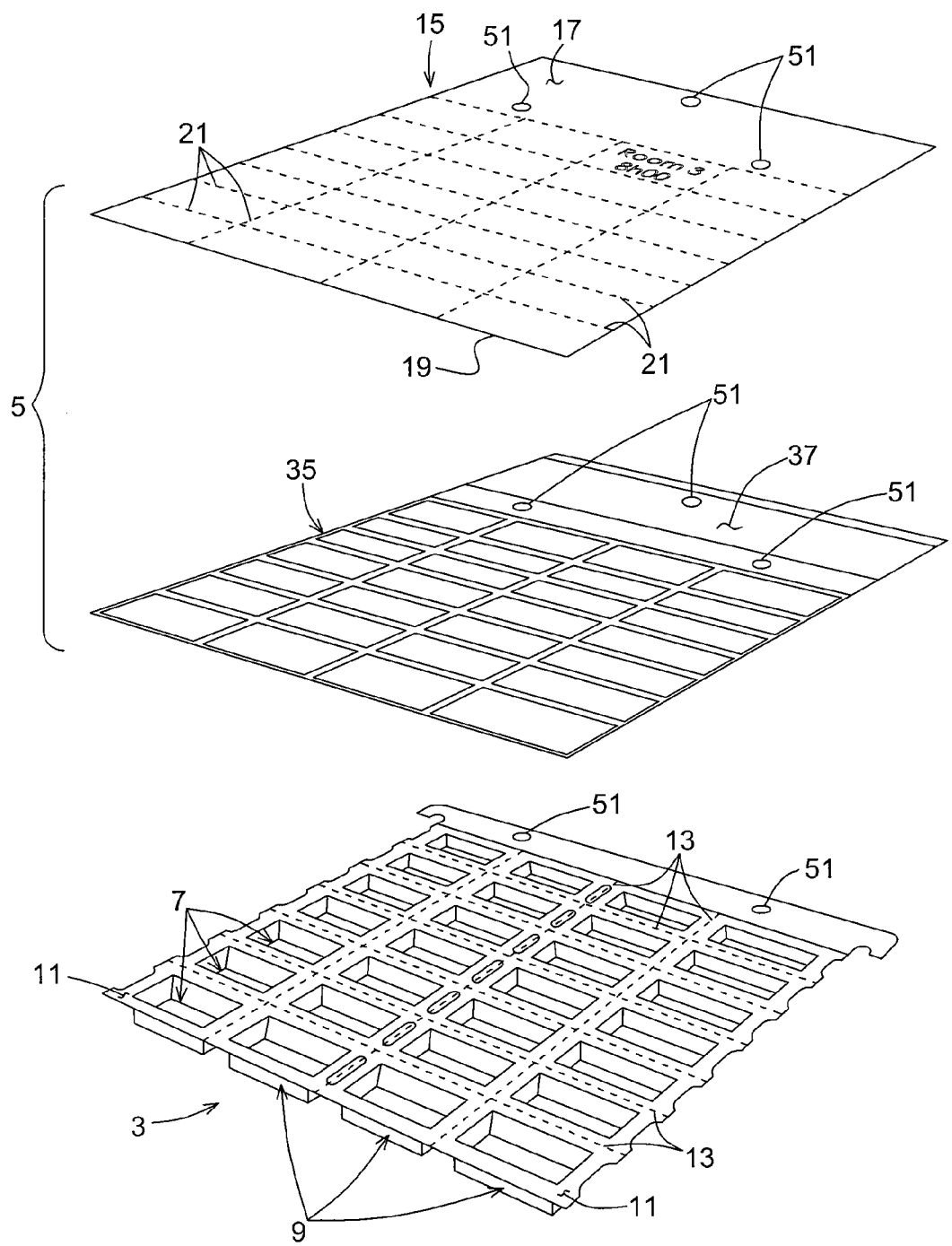
FIG. 1 is an exploded perspective view of a set of individual pill containers provided with a sealing sheet according to a first preferred embodiment of the invention, said sealing sheet being made of two layers that are shown in space-apart position.

As indicated hereinabove, the present invention relates to an improvement made to the structure of a sealing sheet for use to seal a container-defining sheet like the one disclosed hereinafter, which is especially devised to form sets of individual pill containers for use in pharmacies or hospitals. An exploded perspective view of such a set of individual pill containers including a sealing sheet according to a first preferred embodiment of the invention is illustrated in FIG. 1.

This set basically comprises a container-defining a sheet 3 and a sealing sheet 5 intended to be attached on top of the container-defining sheet 3.

The container-defining sheet 3 of this set is preferably made of a plastic material and has a top surface comprising a given number of spaced apart cavities 7 embossed therein. Each cavity 7 is upwardly opened and thus defines a container 9 which is surrounded by a flange 11. Each of the flanges 11 which is not directly adjacent to one external side of the container-defining sheet 3 is provided with a centrally positioned tearing line 13 so as to make it possible to detach each of the containers 9 from all the adjacent containers and thus from the container-defining sheet 3 whenever desired.

The sealing sheet 5 of the set of containers is, in all cases, devised to be positioned on top of the top surface of the container-defining sheet 3 in order to close each of the containers 9.

In every illustrated embodiment of the invention, the sealing sheet 5 comprises a top layer 15 having each an upper surface 17 and a lower surface 19 that is covered at least in part with a pressure sensitive adhesive. The top layer 15 also has tearing lines 21 punched therein in such a manner and position as to be in line with the tearing lines 13 made in the flanges 11 of the top surface of the container-defining sheet 3 and thus to allow the top layer 15, once glued onto the flanges 11 of the container-defining sheet, to be splitted into a number of cover pieces equal to the number of containers 9, such making it possible to detach each of the containers 9 from the container-defining sheet while keeping it closed.

In every embodiment of the invention, the sealing sheet 5 also comprises a bottom layer 35 having an upper surface 37 detachably connected to the lower surface 19 of the top layer 15 by means of the adhesive. This bottom layer 35 is peelable from the lower surface 19 of the top layer 15 to allow fixation of the top layer onto the flanges 11 on the top surface of the container-defining sheet by means of the adhesive covering its lower surface 19 in order to close the containers 9 of the container defining sheet. Of course, such a fixation must be achieved in such a manner that no adhesive be left on top of each container 9 and be at risk of coming into contact with the elements such as pills or tablets that are stored in the container once the fixation has been completed.

As aforesaid, the invention as claimed essentially lies in that the top layer 15 of the sealing sheet 5 is water-proof to make the closure of the container-defining sheet 3, moisture proof once the fixation has been completed, and also in that this top layer 15 has its top surface 17 printable to ensure that relevant information as to the content of each container 9 being made available on it if desired.

Figure 2:
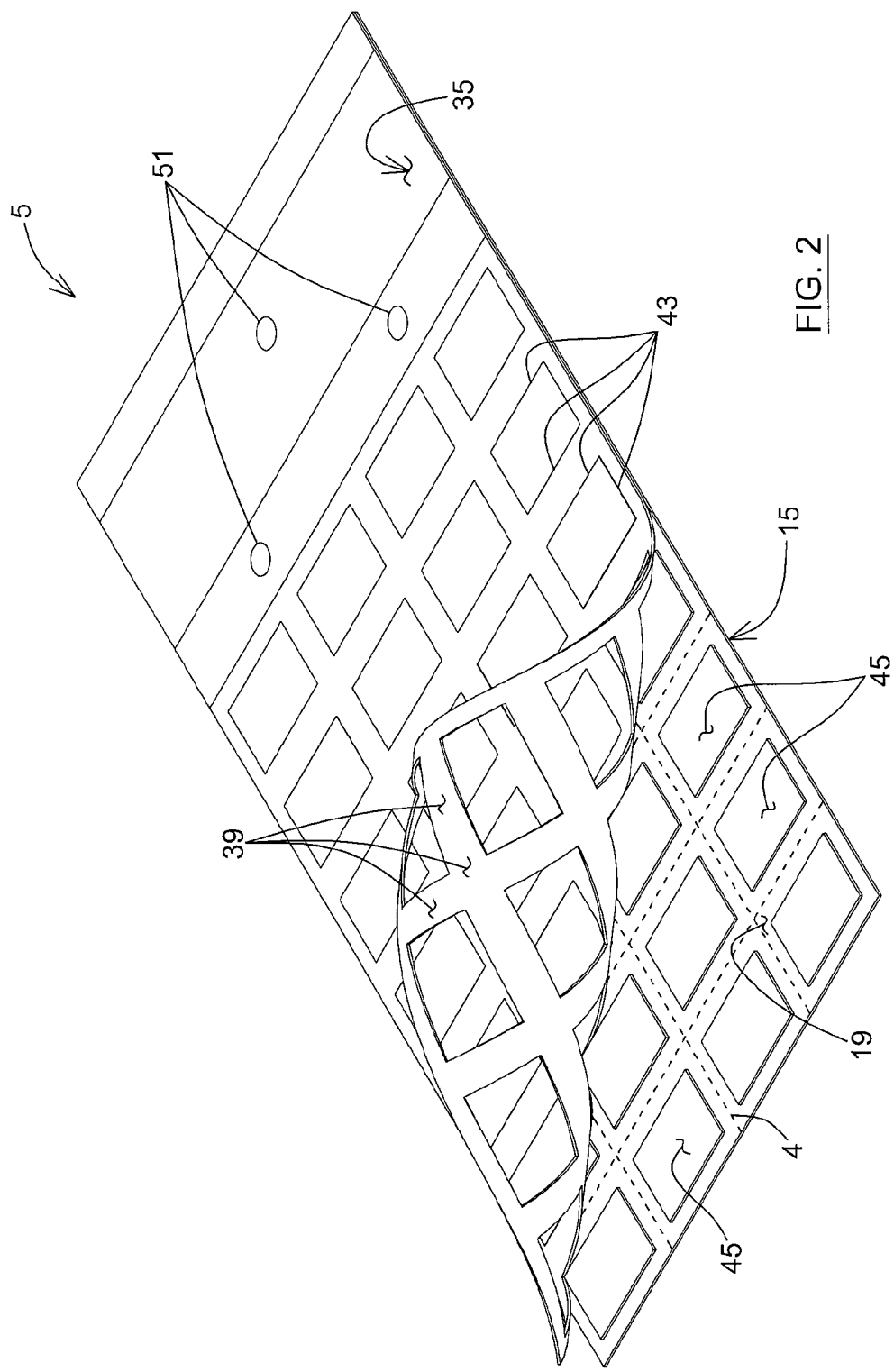
FIG. 2 is a perspective view of the sealing sheet as shown in FIG. 1 but in inversed position, with part of its bottom layer detached from the top layer.

In this first preferred embodiment of the invention shown in FIGS. 1 and 2, the top layer 15 of the sealing sheet 5 has its bottom surface 19 fully covered with the adhesive, and the bottom layer 35 of the sealing sheet 5 has cutting-lines 43 made into it in such a manner and position as to leave parts of said bottom layer 35 glued onto the bottom surface 19 of the top layer 15 in the form of a number of bottom pieces 45 equal to the given number of cavities 7 made in the container-defining sheet 3 when the sealing sheet is peeled off. Each of these bottom pieces 45 are shaped, sized and positioned so as to extend over a corresponding cavity 7 of the container-defining sheet when the top layer 15 of the sealing sheet 5 is properly applied to and glued on the flanges 7 of the top surface of the container-defining sheet 3. In such a case, the covering of silicone of the bottom layer 35 is made in such a pattern as to extend all around the bottom pieces 45 on the surfaces 39 surrounding the same, but not onto said bottom pieces 45.

Figure 3:
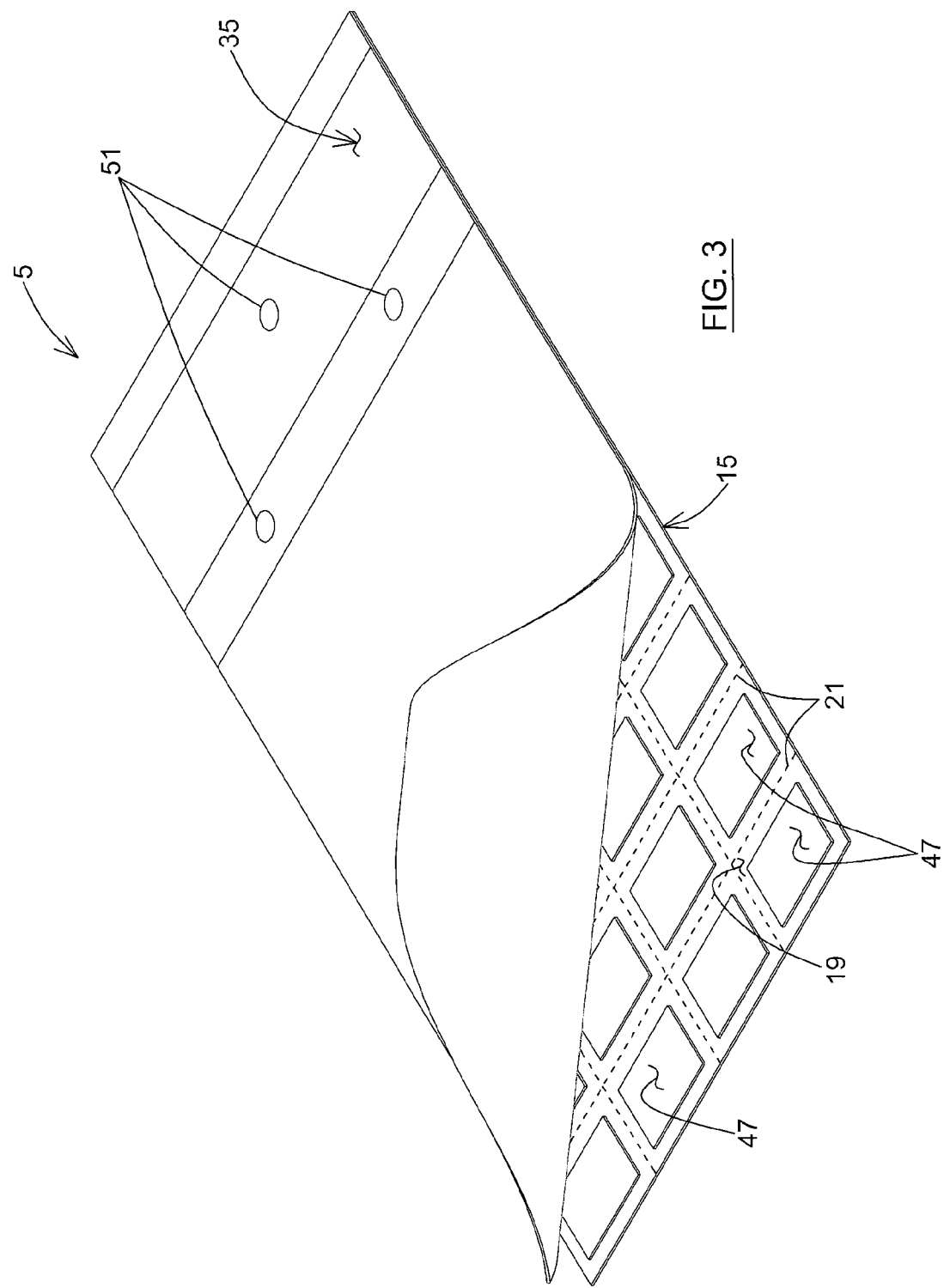
FIG. 3 is a perspective view of a sealing sheet according to a second preferred embodiment of the invention, with part of its bottom layer detached from the top layer.
Figure 4:
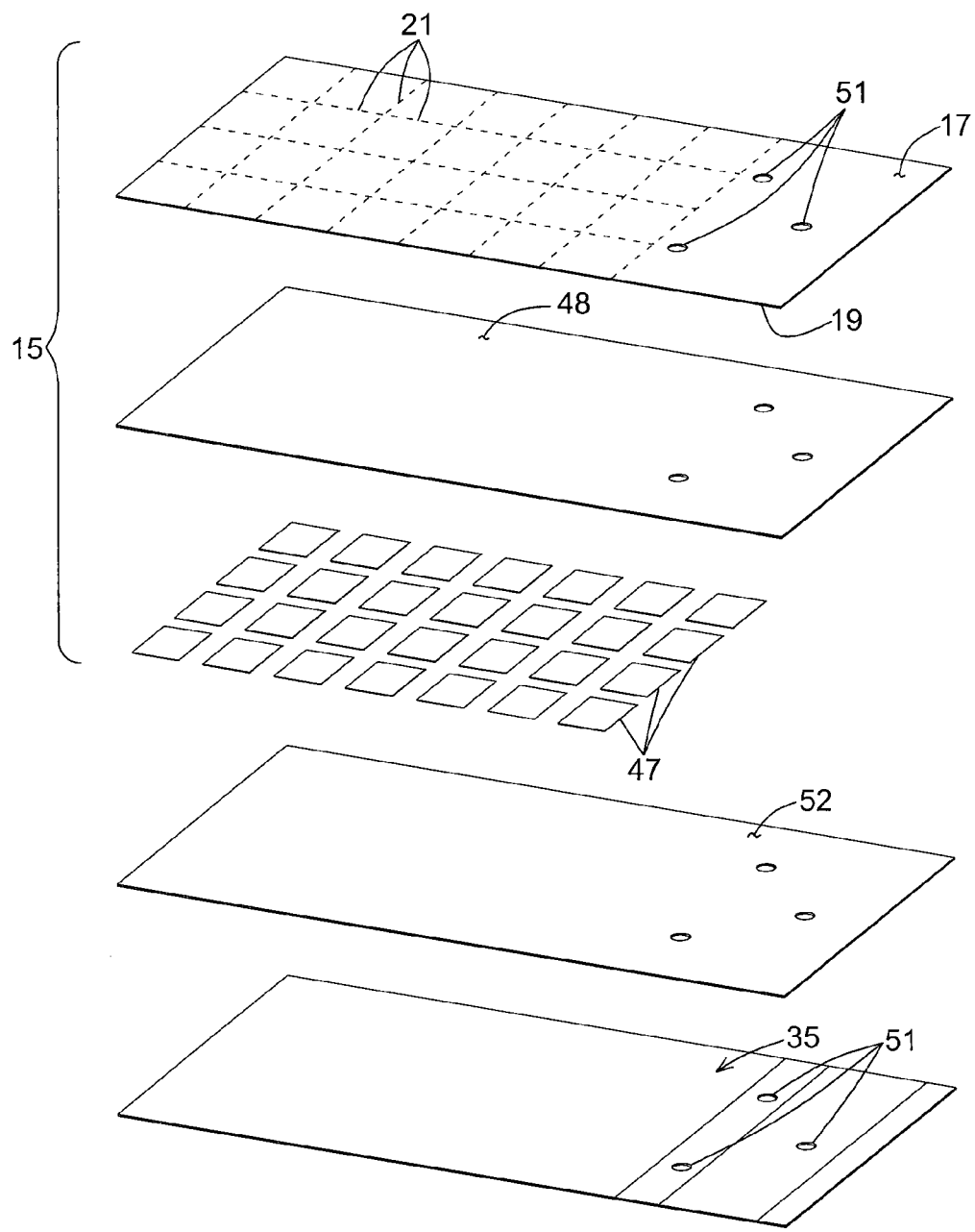
FIG. 4 is an exploded perspective view showing in spaced apart position the different layers and coatings of the sealing sheet shown in FIG. 3.

In the second preferred embodiment of the invention shown in FIGS. 3 and 4, the top layer 15 of the sealing sheet 5 has its lower surface 19 provided with patches of varnish 47 applied in such a manner as to cover the adhesive that, in this particular embodiment, has been applied in the form of a layer 48 covering all of the lower surface 19 of the top layer. The patches of varnish 47 form a number of bottom pieces equal to the given number of cavities 7 made in the container-defining sheet 3 when the sealing sheet is peeled off. Each of the patches of varnish 47 acting as bottom pieces are shaped, sized and positioned so as to extend over a corresponding cavity 7 of the container-defining sheet 5 when the top layer 15 of the sealing sheet is properly applied to and glued on the flanges 11 of the top surface of the container-defining sheet 3. The purpose of such patches of varnish 47 is to prevent the elements contained in the containers from coming into contact with the adhesive. Of course, any other kind of patches not necessarily made of varnish but acting in the same way, could alternatively be used.

As shown in FIG. 4, the bottom layer 35 of the sealing sheet of the second embodiment is fully covered by a layer of silicone 52.

Figure 5:
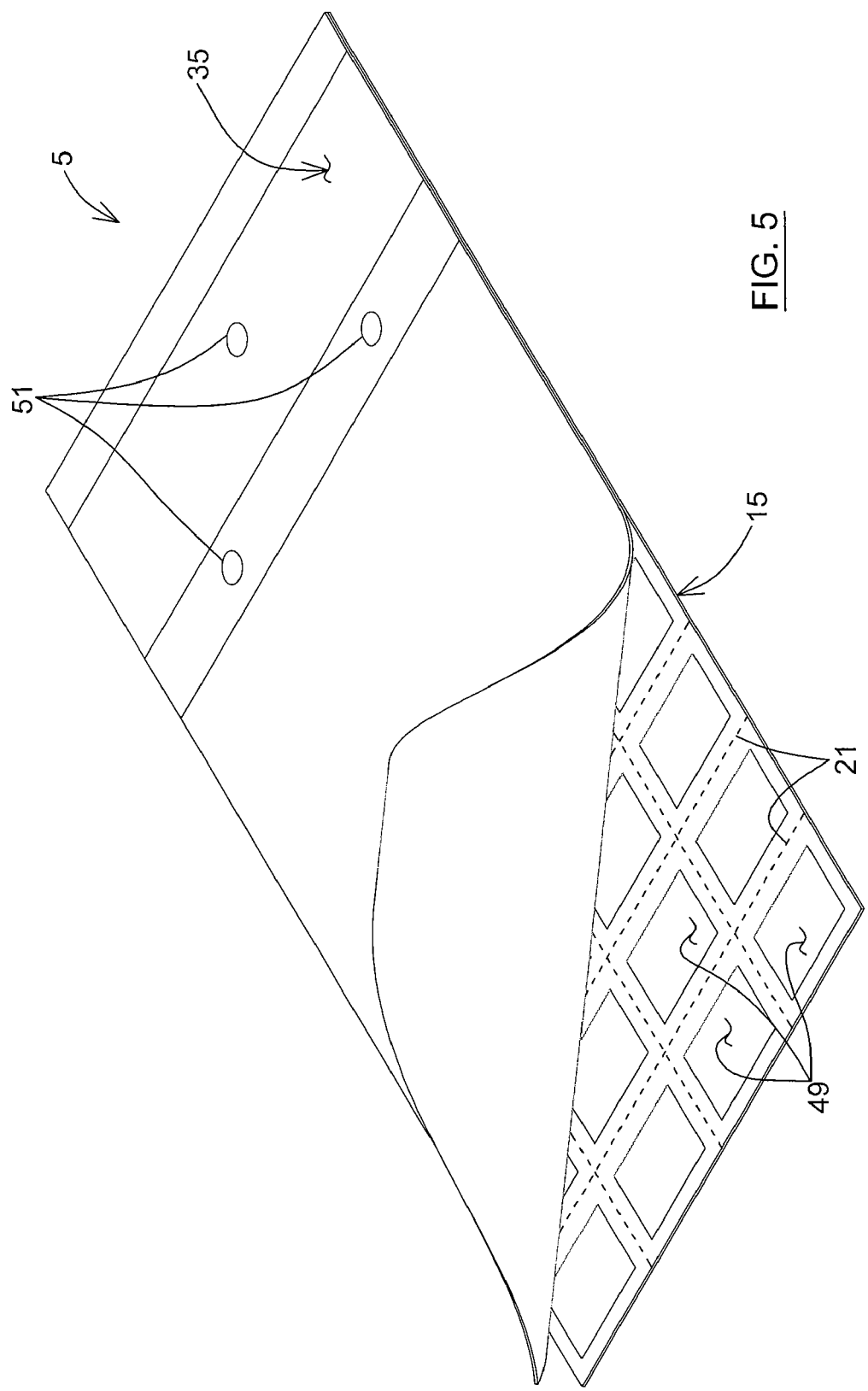
FIG. 5 is a perspective view of a sealing sheet according to a third preferred embodiment of the invention, with part of its bottom layer detached from the top layer.

In the third preferred embodiment of the invention shown in FIG. 5, the top layer 15 of the sealing sheet 5 has a number of bottom surface areas 49 equal to the given number of cavities 7 made in the container-defining sheet 3 when the sealing sheet is peeled off, each of the bottom surface areas 49 is shaped, sized and positioned so as to extend over a corresponding cavity 7 of the container-defining sheet 5 when the top layer 15 of the sealing sheet is properly applied to and glued on the flanges 11 on the top surface 7 of the container-defining sheet 3. Once again is free from said adhesive.

As aforesaid, in all the above-mentioned embodiments, the top layer 15 of the sealing sheet 5 can be made of aluminum. More specifically, use can be made of the aluminum sheet having its upper surface covered with a primer or with a layer of paper, in order to make it printable.

However, it is worth mentioning again that any other kind of water-proof sheet could be used, provided that it has an upper surface printable and a bottom surface coverable by the pressure sensitive adhesive required to fit it into the container-defining sheet. Such a water-proof sheet could also be made of two or more layers of different materials, the only requirement again being that it be water-proof and its top surface be printable. By way of examples, such layers could include one layer made of paper and another layer glued to the first one and made of plastic material.

In the preferred embodiment illustrated in FIG. 1 of the accompanying drawings, which is a set for individual pill containers for use in the pharmaceutical field, the container-defining sheet 3 comprises twenty-eight containers that are positioned in order to define seven rows and four columns. The sealing 5 is devised to form a corresponding number of cover pieces each of which can be printed with relevant information as to the content of the corresponding container, and the date and hour the pills contained therein must be taken.

Such particular application is of course devised for use in the medical field, when pills and/or tablets must be administered every day at different periods of time. As to the way such printing can be done and its advantage, reference can be made to U.S. Pat. No. 5,788,079 naming the present inventor, which has already been mentioned hereinabove.

Of course, it may be understood that, for other applications, the number of containers and the kind of printing may vary.

As also shown in the accompanying drawings, the sealing sheet 5 and the top surface of the container-defining sheet 3 are advantageously provided with positioning means such as holes 51 that may cooperate with pins extending from a recessed support (not shown) in order to ensure proper positioning of both of them with respect to each other during installation and exact superimposition of the bottom pieces 45, 47 or 49 of the sealing sheet on top of the corresponding cavities 7 and with all the tearing lines 21 of the top layer of the sealing sheet in alignment with the tearing lines 13 of the container-defining sheet 3. As to the way such can be done, reference can again be made to U.S. Pat. No. 5,788,079.

Thus, it may be noted that the sealing sheet according to the invention is very simple yet efficient in structure. It provides easy and safe access to the elements stored in the container-defining sheet 3 with no real risk that such elements comes into contact with the glue used to attach the sealing sheet. Moreover, it is quite easy to manufacture and assemble and, due to the fact that the top layer 15 of the sealing sheet 5 glue to the container-defining sheet 3 is water-proof, the content of each container is prevented from moisture over a very long period of time.

As may be appreciated, numerous modifications could be made to the preferred embodiment disclosed hereinabove without departing from the scope of the present invention. In this connection, it is worth reminding that the present invention, even though it is particularly well adapted to the manufacture of sets of individual pill containers for use in the pharmaceutical field, it could be used in other fields for other applications. It may also be noted that the number of containers may vary from one application to another and the shape and size of each of the containers may be modified as requested.

The invention claimed is:

1. A sealing sheet for use to close a container-defining sheet having a top surface comprising a given number of spaced apart cavities embossed therein, each of said cavities being upwardly opened and thus defining a container that is surrounded by a flange that is part of the top surface of said container-defining sheet, each of the flanges that are not directly adjacent to one side of the container-defining sheet being provided with a centrally positioned tearing line so as to make it possible to separate each of the containers from the adjacent containers and thus from the container-defining sheet whenever desired;

said sealing sheet comprising:

a top layer having an upper surface and a lower surface that is covered at least in part with a pressure sensitive adhesive, said top layer also having tearing lines punched therein in such a manner and position as to be in line with the tearing lines made in the flanges on the top surface of the container-defining sheet and thus to allow said top layer, once glued onto the flanges of the container-defining sheet, to be splitted into a number of cover pieces equal to the number of containers, such making it possible to detach each of said containers from the container-defining sheet while keeping it closed; and a bottom layer having an upper surface detachably connected to the lower surface of the top layer by means of said adhesive, said bottom layer being peelable from the lower surface of the top layer to allow fixation of said top layer onto the flanges on the top surface of the container-defining sheet by means of the adhesive covering its lower surface in order to close the containers defined in said container defining sheet, such a fixation being achieved in such a manner that no adhesive be left on top of each container and be at risk of coming into contact with elements stored in said container once the fixation has been completed, characterized in that:

the top layer of the sealing sheet is water-proof to make the closure of the container defining sheet moisture proof once the fixation has been completed;

the top layer of the sealing sheet has its top surface printable to ensure that relevant information as to the content of each container being made available on it if desired;

the top layer of the sealing sheet has its bottom surface fully covered with the adhesive;

the bottom layer of the sealing sheet has cutting-lines made into it in such a manner and position as to leave parts of said bottom layer glued onto the bottom surface of the top layer in the form of a number of bottom pieces equal to the given number of cavities made in the container-defining sheet when said sealing sheet is peeled off, each of said bottom pieces being shaped, sized and positioned so as to extend over a corresponding cavity of the container-defining sheet when the top layer of the sealing sheet is properly applied to and glued on the flanges of the top surface of the container-defining sheet; and the bottom layer of the sealing sheet is made of paper and the upper surface thereof has a partial covering of silicone, patterned such that the silicone does not to extend onto said bottom pieces but otherwise extends to every part of the upper surface of the bottom layer that is in contact with the adhesive that covers the lower surface of the top layer of said sealing sheet.

2. The sealing sheet of claim 1, wherein the top layer of the sealing sheet is made of aluminum.

3. The sealing sheet of claim 1, wherein the sealing sheet and the top surface of the container-defining sheet are provided with positioning means to ensure proper positioning of both of them with respect to each other during installation and thus exact superimposition of the bottom pieces of the sealing sheet on top of the corresponding cavities, and exact superimposition of the tearing lines of the top layer of the sealing sheet with the tearing lines of container-defining sheet.

4. The sealing sheet of claim 3, wherein said positioning means consists of at least two spaced apart holes sized to fit onto pins projecting from a support.

\* \* \* \* \*